(12) United States Patent
Hu et al.

(10) Patent No.: US 8,212,177 B2
(45) Date of Patent: Jul. 3, 2012

(54) VARIABLE FOCUS LASER MACHINING SYSTEM

(75) Inventors: Zhaoli Hu, Dunlap, IL (US); Chunfu Cliff Huang, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 946 days.

(21) Appl. No.: 12/216,115

(22) Filed: Jun. 30, 2008

(65) Prior Publication Data

US 2009/0321395 A1    Dec. 31, 2009

Related U.S. Application Data

(60) Provisional application No. 60/935,481, filed on Aug. 15, 2007.

(51) Int. Cl.
 *B23K 26/00* (2006.01)
(52) U.S. Cl. .......... 219/121.68; 219/121.69; 219/121.7; 219/121.71
(58) Field of Classification Search .......... 219/121.65–121.72, 121.76, 121.77, 219/121.82
 See application file for complete search history.

(56) References Cited

U.S. PATENT DOCUMENTS

| | | | |
|---|---|---|---|
| 4,063,064 A | 12/1977 | Saunders et al. | |
| 4,574,180 A * | 3/1986 | Kasner et al. | 219/121.82 |
| 4,785,161 A * | 11/1988 | Strom | 219/121.69 |
| 4,789,770 A | 12/1988 | Kasner et al. | |
| 4,839,497 A | 6/1989 | Sankar et al. | |
| 5,063,280 A * | 11/1991 | Inagawa et al. | 219/121.7 |
| 5,093,548 A | 3/1992 | Schmidt-Hebbel | |
| 5,237,148 A | 8/1993 | Aoki et al. | |
| 5,332,881 A | 7/1994 | Topkaya et al. | |
| 6,070,813 A | 6/2000 | Durheim | |
| 6,355,907 B1 | 3/2002 | Kuehnle et al. | |
| 6,437,283 B1 | 8/2002 | Wiggermann et al. | |
| 6,642,477 B1 | 11/2003 | Patel et al. | |
| 6,720,567 B2 | 4/2004 | Fordahl et al. | |
| 6,787,734 B2 | 9/2004 | Liu | |
| 6,849,222 B2 | 2/2005 | Yamaguchi et al. | |
| 6,951,627 B2 | 10/2005 | Li et al. | |
| 2003/0227614 A1* | 12/2003 | Taminiau et al. | 356/125 |
| 2005/0067740 A1* | 3/2005 | Haubensak | 264/400 |
| 2005/0187615 A1* | 8/2005 | Williams et al. | 623/1.34 |
| 2005/0236911 A1 | 10/2005 | Botos et al. | |
| 2006/0081575 A1 | 4/2006 | Egawa et al. | |
| 2007/0278194 A1* | 12/2007 | Hoelsher et al. | 219/121.6 |

FOREIGN PATENT DOCUMENTS

| | | |
|---|---|---|
| DE | 4217705 A1 * | 12/1993 |
| JP | 2003053572 | 2/2003 |
| WO | 2004011187 | 2/2004 |

* cited by examiner

*Primary Examiner* — Samuel M Heinrich
(74) *Attorney, Agent, or Firm* — Finnegan, Henderson, Farabow, Garrett & Dunner LLP (57) ABSTRACT

A variable focus laser machining system is disclosed. The machining system may have a laser emitter configured to emit a laser beam. Additionally, the machining system may have a focusing element configured to focus the laser beam. The machining system may also have a controller. The controller may be configured to focus the laser beam at a first focal point. The first focal point may be approximately positioned on a first machining surface of a work piece. The controller may also be configured to determine that the first machining surface has moved relative to the first focal point. Additionally, the controller may be configured to re-focus the laser beam at a second focal point. The second focal point may be positioned between a second machining surface and a predetermined surface spaced apart from the second machining surface.

20 Claims, 4 Drawing Sheets

VARIABLE FOCUS LASER MACHINING SYSTEM

This application claims the benefit of U.S. Provisional Application No. 60/935,481, filed Aug. 15, 2007.

TECHNICAL FIELD

The present disclosure relates generally to a laser machining system and, more particularly, to a variable focus laser machining system.

BACKGROUND

Fuel injectors are sometimes used to inject high pressure fuel into cylinders of combustion engines. Specifically, the high pressure fuel is directed into tips of the fuel injectors. Each of these tips includes one or more orifices. The high pressure fuel passes through these orifices into one of the cylinders. To enhance operation of the combustion engine, the orifices are precisely formed to have a particular profile and an opening diameter. Historically, these orifices have been formed through percussion laser drilling. Although effective in some applications, percussion laser drilling may be limited in that it may be incapable of producing a reverse taper in an orifice of a fuel injector tip (i.e., a generally conically-shaped hole originating from a larger internal diameter and terminating at a smaller external diameter of the injector tip).

One attempt to produce a reverse tapered orifice in a fuel injector tip is disclosed in U.S. Pat. No. 6,642,477 (the '477 patent) issued to Patel et al. on Nov. 4, 2003. In particular, the '477 patent describes a machining process whereby the orifice is drilled by a laser beam directed at an external surface of the injector tip. To produce the reverse taper, the external surface is tilted relative to the laser beam and rotated about an axis such that an ablation region, following a full 360° rotation, delimits the reverse tapered orifice. In this manner, each orifice has a larger opening at one side of the fuel injector tip wall than at the other side.

Although the machining process described in the '477 patent may produce an orifice having a reverse taper, it may not help prevent undesirable melting within the ablation region during the drilling. In particular, the described process may not compensate for changes to the ablation region during the drilling. For example, the described process may not compensate for translational movement of the external surface relative to a focal point of the laser beam. Additionally, the described process may not compensate for partially ablated material (i.e., material that has not been fully ejected from the ablation region), which may block the laser beam. The translational movement and the blocking of the laser beam may decrease a machining power of the laser beam, causing melting within the ablation region.

The present disclosure is directed to overcoming one or more of the problems set forth above and/or other problems in the art.

SUMMARY

In one aspect, the present disclosure may be directed to a variable focus laser machining system. The machining system may include a laser emitter configured to emit a laser beam. Additionally, the machining system may include a focusing element configured to focus the laser beam. The machining system may also include a controller. The controller may be configured to focus the laser beam at a first focal point. The first focal point may be approximately positioned on a first machining surface of a work piece. The controller may also be configured to determine that the first machining surface has moved relative to the first focal point. Additionally, the controller may be configured to re-focus the laser beam at a second focal point. The second focal point may be positioned between a second machining surface and a predetermined surface spaced apart from the second machining surface.

In another aspect, the present disclosure may be directed to a method of machining. The method may include focusing a laser beam at a first focal point. The first focal point may be approximately positioned on a first machining surface of a work piece. The method may also include determining that the first machining surface has moved relative to the first focal point. Additionally, the method may include re-focusing the laser beam at a second focal point. The second focal point may be positioned between a second machining surface and a predetermined surface spaced apart from the second machining surface.

DETAILED DESCRIPTION

Figure 1:
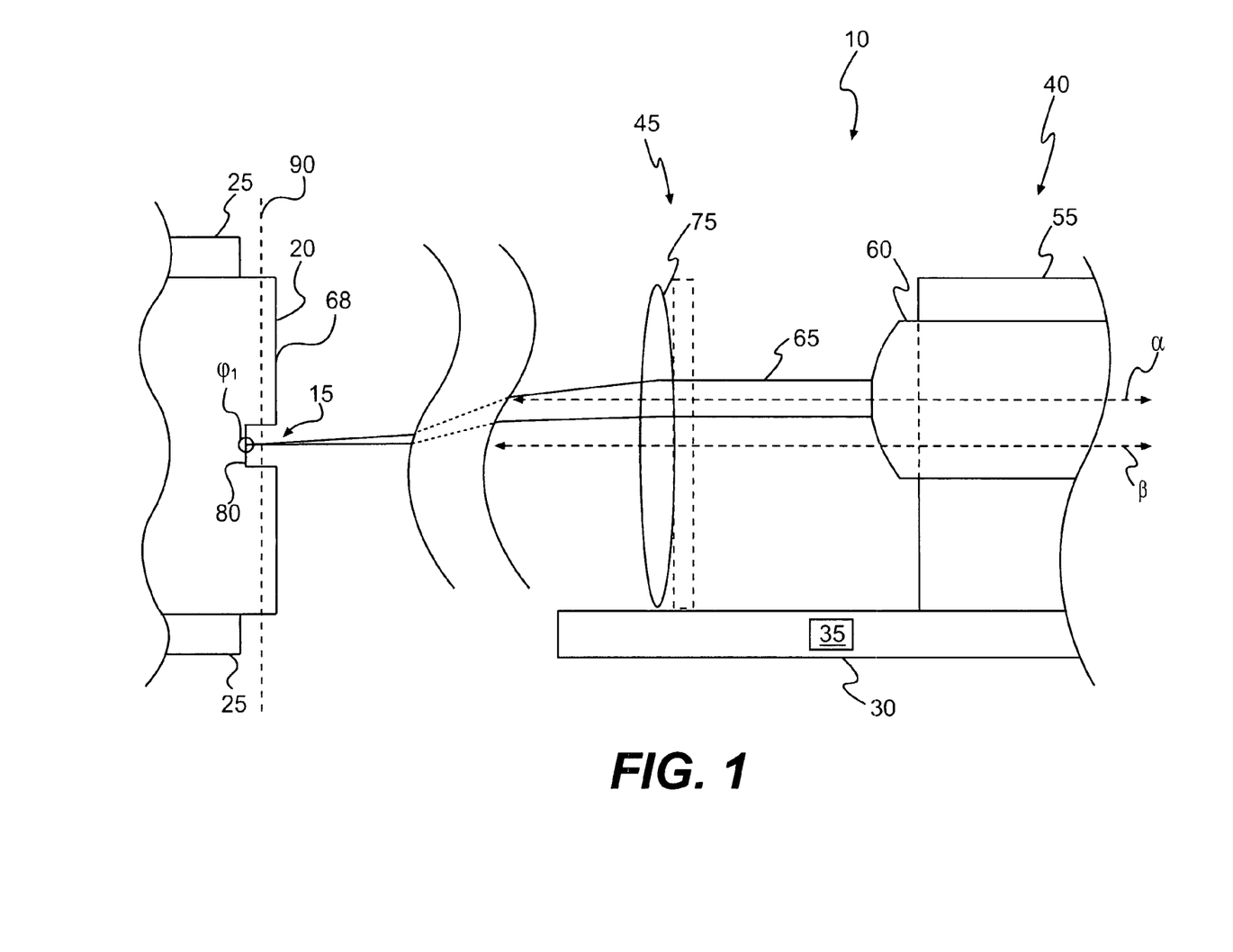
FIG. 1 is a side view of an exemplary disclosed variable focus laser machining system having a laser beam focused approximately on a first machining surface of a work piece.

FIG. 1 illustrates a variable focus laser machining system 10 producing an orifice 15 within a work piece 20. Although work piece 20 is illustrated as cylindrical, it should be understood that work piece 20 may have another shape. It should also be understood that work piece 20 and orifice 15 may be relatively larger or smaller than illustrated. Furthermore, though orifice 15 is illustrated as cylindrical, it should be understood that orifice 15 may also have another shape. For example, work piece 20 may be a fuel injector having a tip. And orifice 15 may be a tapered orifice passing through the tip.

Machining system 10 may include a base 25 configured to support work piece 20. Machining system 10 may also include a base 30 configured to support a controller 35, a laser assembly 40, and a focusing assembly 45. Laser assembly 40 and focusing assembly 45 may be attached to base 30. Base 30 may enclose and protect controller 35, the internal mechanisms, and the electronics that operate laser assembly 40 and focusing assembly 45. Base 30 may be configured to mount laser assembly 40 and focusing assembly 45 to a table, a floor, an interior wall, or another surface known in the art.

Base 25 may be used to pose work piece 20 relative to laser assembly 40 in anticipation of or during machining. As used herein, pose means to position and/or orient. Base 25 may include a clamp with a vise, a collet, and/or another device operable to hold work piece 20 approximately stationary. Additionally or alternatively, base 25 may include a linear and/or a rotary actuator (not shown) to move and/or rotate work piece 20 relative to laser assembly 40 in anticipation of or during machining. This linear and/or rotary actuator may include, for example, a mechanical actuator, a piezoelectric actuator, a hydraulic actuator, an electro-mechanical actuator, or another type of actuator known in the art.

Laser assembly 40 may include frame 55, which may house a laser emitter 60. Frame 55 may be attached directly or indirectly to base 30, and laser emitter 60 may be attached directly or indirectly to frame 55. Laser emitter 60 may include a superpulse laser, a femto second laser, or another laser operable to machine work piece 20. In particular, laser emitter 60 may emit a laser beam 65, which may be directed toward and remove material from work piece 20. As used herein, laser beam 65 may include any and/or all laser beams emitted by laser emitter 60 during the machining of work piece 20. The direction of laser beam 65 may be via one or more optical devices (not shown), which may bend, focus, and/or otherwise modify laser beam 65. For example, frame 55 may house optical devices, which may direct laser beam 65 along an axis $\alpha$ toward focusing assembly 45, which may further bend, focus, and/or otherwise modify laser beam 65. It is contemplated that the optical devices may be moved, tilted, and/or rotated to move, tilt, and/or rotate axis $\alpha$. For example, the optical devices may rotate axis $\alpha$ about an axis $\beta$, which may be orthogonal to an exterior surface 68 of work piece 20. As another example, the optical devices may tilt axis $\alpha$ such that axis $\alpha$ intersects axis $\beta$.

Figure 2:
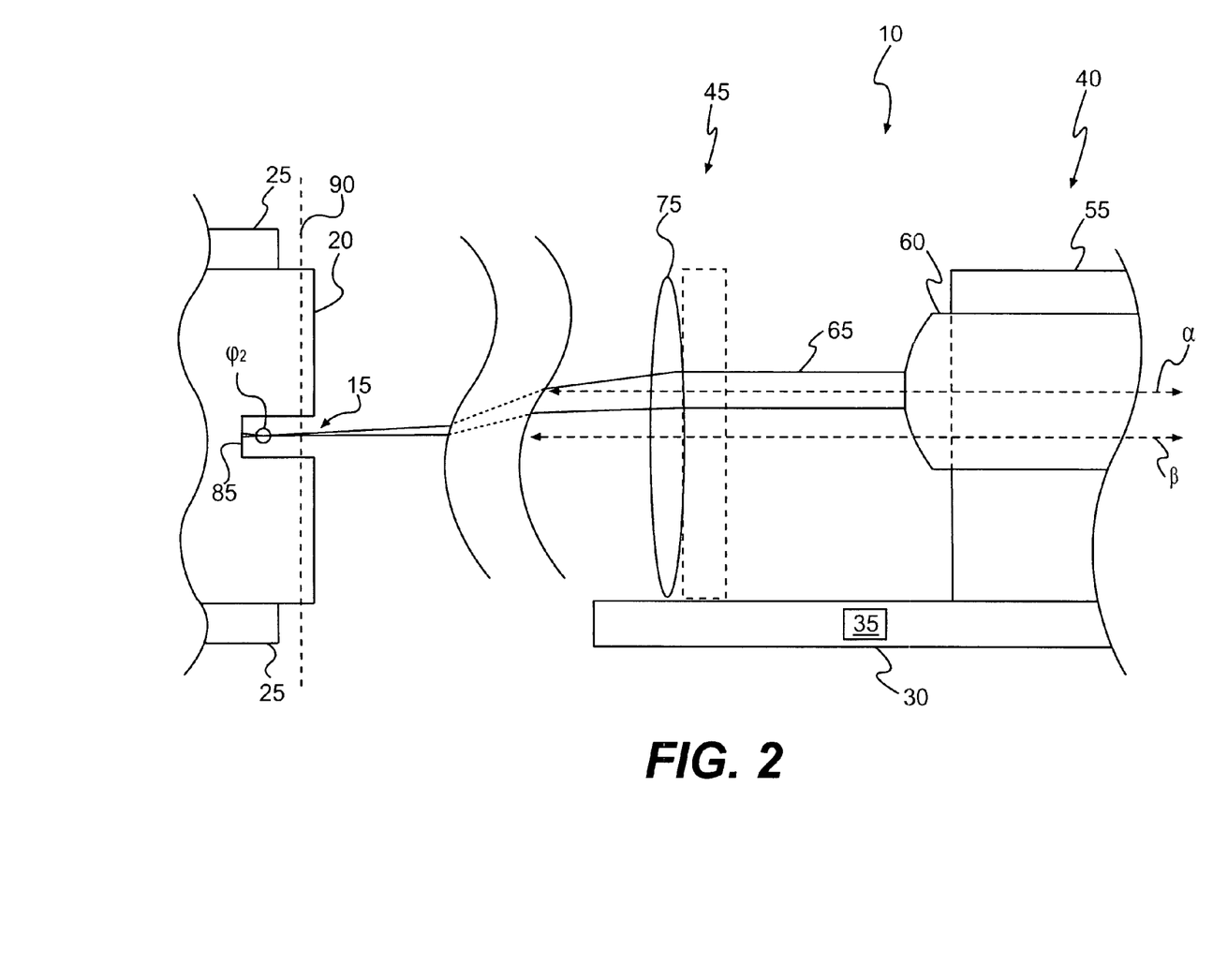
FIG. 2 is another side view of the machining system of FIG. 1 showing the laser beam focused between a second machining surface of the work piece of FIG. 1 and a predetermined surface.
Figure 3:
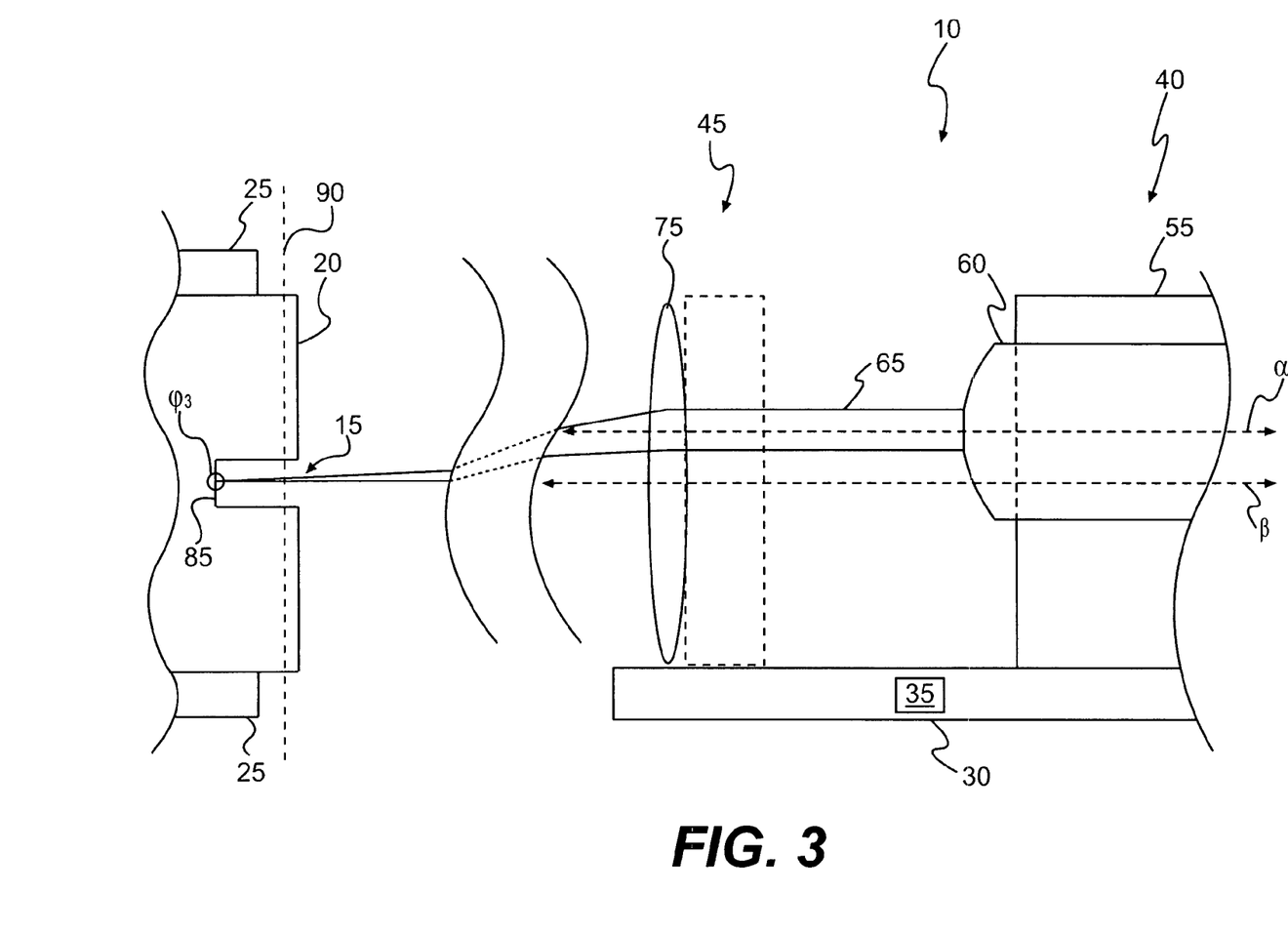
FIG. 3 is another side view of the machining system of FIG. 1 showing the laser beam focused approximately on the second machining surface of FIG. 2.

Focusing assembly 45 may include a focusing assembly actuator (not shown), which may move a focusing element 75. Focusing element 75 may be disposed between laser assembly 40 and work piece 20. Focusing element 75 may include a lens, such as, for example, a biconvex or a plano-convex lens, oriented to focus laser beam 65 at a focal point $\phi$. Focusing element 75 may be movable along axis $\beta$ by the focusing assembly actuator to selectively position focal point $\phi$. For example, focal point $\phi$ may be positioned at a focal point $\phi_1$, which may be approximately positioned on a first machining surface 80 of work piece 20. First machining surface 80 may be a surface from which material may be removed to produce orifice 15. First machining surface 80 and exterior surface 68 may be coplanar. Alternatively or additionally, first machining surface 80 may be a surface of work piece 20 at which laser machining is initiated. As another example, illustrated in FIG. 2, focal point $\phi$ may be positioned at a focal point $\phi_2$, which may be positioned between a second machining surface 85 of work piece 20 and a predetermined surface 90 spaced apart from second machining surface 85. As used herein, between is an inclusive operator. In other words, focal point $\phi_2$ may be approximately positioned on either of second machining surface 85 or predetermined surface 90. Second machining surface 85 may be another surface from which material may be removed to produce orifice 15. Second machining surface 85 may be an internal surface of work piece 20. Alternatively or additionally, second machining surface 85 may be a surface exposed as material is removed from first machining surface 80. Predetermined surface 90 may an imaginary surface located downstream of focusing element 75. As used herein, a first object is located downstream of a second object if laser beam 65 contacts or passes through the second object before contacting or passing through the first object. More specifically, predetermined surface 90 may be located between second machining surface 85 and focusing element 75. In some embodiments, predetermined surface 90 and first machining surface 80 may be coplanar (i.e., focal point $\phi_1$ may be approximately positioned on predetermined surface 90). In other embodiments, predetermined surface 90 may be located upstream of first machining surface 80 (i.e., focal point $\phi_1$ may be positioned downstream of predetermined surface 90). As yet another example, illustrated in FIG. 3, focal point $\phi$ may be positioned at a focal point $\phi_3$, which may be approximately positioned on second machining surface 85.

The focusing assembly actuator may include a piezoelectric actuator having one or more columns of piezoelectric crystals. Piezoelectric crystals are structures with random domain orientations. These random orientations are asymmetric arrangements of positive and negative ions that exhibit permanent dipole behavior. When an electric field is applied to the crystals, such as, for example, by the application of a current, the piezoelectric crystals expand along the axis of the electric field as the domains line up. This allows fine control of the movement of the focusing assembly actuator. Alternatively, the focusing assembly actuator may include a mechanical actuator, a hydraulic actuator, an electro-mechanical actuator, or another type of actuator known in the art.

The focusing assembly actuator may be connected to base 30 and focusing element 75 to mechanically control the motion of focusing element 75. For example, as a current is applied to the piezoelectric crystals of the focusing assembly actuator, the focusing assembly actuator may expand to move focusing element 75 toward work piece 20 and toward predetermined surface 90. In contrast, as the current is removed from the piezoelectric crystals of the focusing assembly actuator, the focusing assembly actuator may contract to move focusing element 75 away from work piece 20 and away from predetermined surface 90. It is contemplated that the piezoelectric crystals of the focusing assembly actuator may be omitted, if desired, and the movement of focusing element 75 be controlled in another suitable manner. Alternatively, it is contemplated that an actuator (not shown) may be associated with base 25 to move work piece 20. This actuator may move work piece 20 toward focusing element 75 and predetermined surface 90. The actuator may also move work piece 20 away from focusing element 75 and away from predetermined surface 90.

Controller 35, which may include one or more processors (not shown) and one or more memory devices (not shown), may be associated with laser assembly 40 and focusing assembly 45 to vary the focus of laser beam 65. In particular, controller 35 may communicate with various sensors, operator input devices, and/or maps to obtain and/or determine the location of first machining surface 80, second machining surface 85, and/or predetermined surface 90. For example, controller 35 may communicate with an operator interface device (not shown) to determine the location of first machining surface 80, second machining surface 85, and/or predetermined surface 90. Alternatively, controller 35 may communicate with a range finder (not shown) or another device known in the art to determine the location of first machining surface 80, second machining surface 85 and/or predetermined surface 90. In yet another alternative, controller 35 may access a progress map (not shown) to determine the location of first machining surface 80, second machining surface 85 and/or predetermined surface 90. Based on the locations of first machining surface 80, second machining surface 85, and/or predetermined surface 90, controller 35 may communicate with the focusing assembly actuator or another actuator associated with focusing element 75 or base 25 to move focusing element 75 relative to work piece 20.

Figure 4:
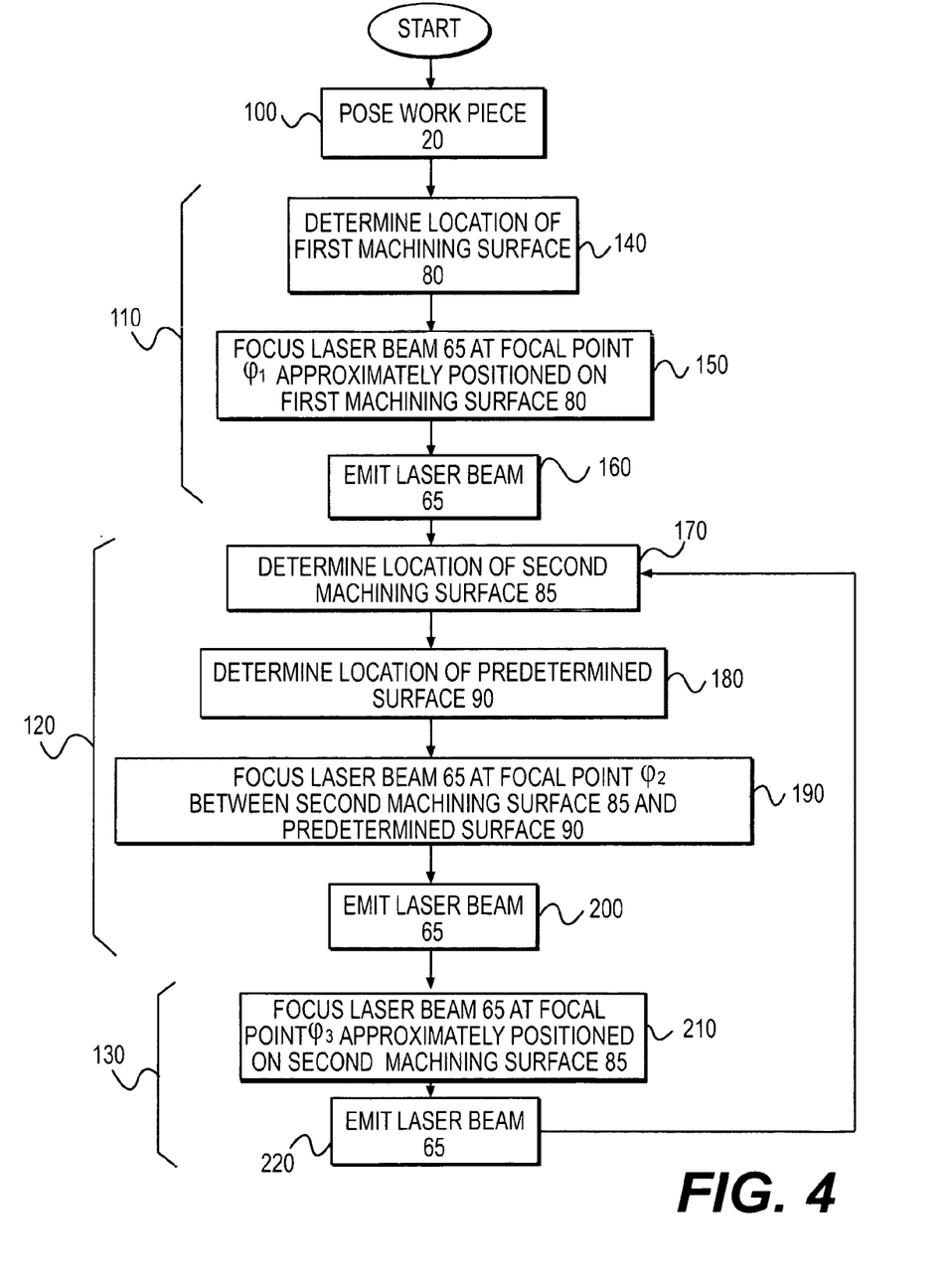
FIG. 4 is a flow chart describing an exemplary method of operating the machining system of FIG. 1.

FIG. 4 illustrates an exemplary method of operating machining system 10 to produce orifice 15 within work piece 20. FIG. 4 will be discussed in the following section to further illustrate machining system 10 and its operation.

INDUSTRIAL APPLICABILITY

The disclosed machining system may be used to produce an orifice within a work piece. In particular, the machining system may be used to emit a laser beam, which may remove material from the work piece, thereby producing the orifice. The machining system may vary a focus of the laser beam in response to the removal of material, preventing undesirable melting of the work piece. Operation of the machining system will now be described with reference to FIG. 4.

At a step 100, base 25 may be used to pose work piece 20 relative to laser assembly 40. Machining system 10 may then produce orifice 15. In particular, machining system 10 may, at a step 110, remove material from first machining surface 80 (referring to FIG. 1). Specifically, laser beam 65 may contact and heat first machining surface 80. Once an ablation temperature of the material is reached, some of the material may be vaporized and ejected from first machining surface 80, partially producing orifice 15. Other material may only be partially vaporized and/or ejected from first machining surface 80. In other words, this material, though no longer attached to work piece 20, may remain within orifice 15 and block laser beam 65. As material is ejected and/or partially ejected from first machining surface 80, laser beam 65 may begin contacting another newly exposed machining surface, located downstream of first machining surface 80. In other words, the machining surface (where laser beam 65 removes material from work piece 20) may move downstream relative to first machining surface 80. That is, as the material is removed from work piece 20, a new surface of work piece 20, referred to herein as second machining surface 85 (referring to FIG. 2), may be exposed. Machining system 10 may, at a step 120, remove the partially ejected material. Specifically, laser beam 65 may contact and heat the partially ejected material. Once the ablation temperature of the material is reached, the partially ejected material may be vaporized and ejected from orifice 15 such that it no longer blocks laser beam 65. Machining system 10 may then, at a step 130, remove material from second machining surface 85 (referring to FIG. 3). This removal may be similar to the removal of material from first machining surface 80. Specifically, some material may only be partially vaporized and/or ejected from second machining surface 85. Thus, machining system 10 may repeat steps 120-130 until it finishes producing orifice 15. During each iteration, machining system 10 may treat second machining surface 85 from the previous iteration as first machining surface 80. And machining system 10 may treat yet another newly exposed machining surface, located downstream of second machining surface 85 from the previous iteration, as second machining surface 85.

The removing described with respect to step 110 may include sub-steps. In particular, controller 35 may determine the location of first machining surface 80 (sub-step 140) by communicating with the operator interface device. For example, an operator of machining system 10 may measure or otherwise ascertain the location of first machining surface 80. The operator may then input this location into the operator interface device, which may communicate the location to controller 35. Alternatively, controller 35 may determine the location of first machining surface 80 by communicating with the range finder. Specifically, the range finder may determine the location of first machining surface 80 and then communicate this location to controller 35. The range finder may include, for example, a laser range finder, a radio range finder, or another type of range finder known in the art.

Based on the location of first machining surface 80, controller 35 may focus laser beam 65 at focal point $\phi_1$, which may be approximately positioned on first machining surface 80 (sub-step 150). Controller 35 may focus laser beam 65 by communicating with the focusing assembly actuator or another actuator associated with focusing element 75 or base 25 to move, relative to each other, at least one of focusing element 75 or work piece 20. This movement may be via movement of focusing element 75 relative to predetermined surface 90. For example, controller 35 may use the focusing assembly actuator to move focusing element 75. Specifically, if the focusing assembly actuator includes a piezoelectric actuator, controller 35 may alter the electric current applied to the focusing assembly actuator to move focusing element 75. Alternatively, the movement, relative to each other, of the at least one of focusing element 75 or work piece 20 may be via movement of work piece 20 relative to predetermined surface 90. For example, controller 35 may use the actuator associated with base 25 to move work piece 20.

Next, controller 35 may emit laser beam 65 (sub-step 160), which may remove material from first machining surface 80, as previously discussed. Controller 35 may emit laser beam 65 by communicating with laser emitter 60 to emit laser beam 65. In some embodiments, controller 35 may rotate axis α about axis β and/or tilt axis α to intersect axis β during this emitting, causing focal point $\phi_1$ to move along first machining surface 80 and produce a tapered orifice 15. Controller 35 may rotate axis α about axis β and/or tilt axis α to intersect axis β by communicating with the optical devices housed by frame 55.

The removing described with respect to step 120 may also include sub-steps. In particular, controller 35 may determine the location of second machining surface 85 (sub-step 170) by communicating with the operator interface device. For example, the operator may measure or otherwise ascertain the location of second machining surface 85. The operator may then input this location into the operator interface device, which may communicate the location to controller 35. Alternatively, controller 35 may determine the location of second machining surface 85 by communicating with the range finder. Specifically, the range finder may determine the location of second machining surface 85 and then communicate this location to controller 35. The range finder may include, for example, a laser range finder, a radio range finder, or another type of range finder known in the art. In yet another alternative, controller 35 may determine the location of second machining surface 85 by accessing the progress map. The progress map may relate the location of second machining surface 85 to an elapsed machining time (i.e., an elapsed time of the emitting of laser beam 65). For example, the progress map may be created by an iterative process. The iterative process may include repeatedly emitting laser beam 65, measuring an elapsed time, and measuring the location of second machining surface 85. The progress map may depend upon properties of work piece 20, laser emitter 60, and/or focusing element 75; relative locations of work piece 20, laser emitter 60, and/or focusing element 75; and/or a desired geometry of orifice 15. Once created, the progress map may be used to speed production of multiple orifices 15. For example, one progress map may be applicable to all orifices 15 produced on an assembly line. During production of these orifices, no measuring of the location of second machining surface 85 may need to be performed. Instead, the location of second machining surface 85 may be predicted by accessing the progress map.

Before, after, or concurrent with sub-step 170, controller 35 may also determine the location of predetermined surface 90 (sub-step 180) by communicating with the operator interface device. For example, the operator may choose the location of predetermined surface 90. This choice may be based on the location of first machining surface 80 or second machining surface 85. For example, predetermined surface 90 may be spaced apart from first machining surface 80 by a predetermined distance. Alternatively, predetermined surface 90 may be spaced apart from second machining surface 85 by a predetermined distance. In yet another alternative, predetermined surface 90 and first machining surface 80 may be coplanar. Alternatively or additionally, predetermined surface 90 and exterior surface 68 may be coplanar. The operator may then input the location into the operator interface device, which may communicate the location to controller 35. Alternatively, controller 35 may determine the location of predetermined surface 90 by accessing the progress map. As previously discussed, the progress map may relate the location of second machining surface 85 to the elapsed machining time. Controller 35 may calculate the location of predetermined surface 90 based on this location of second machining surface 85.

Based on the locations of second machining surface 85 and predetermined surface 90, controller 35 may re-focus laser beam 65 at focal point $\phi_2$, which may be positioned between second machining surface 85 and predetermined surface 90 (sub-step 190). Controller 35 may re-focus laser beam 65 by communicating with the focusing assembly actuator or another actuator associated with focusing element 75 or base 25 to move, relative to each other, at lest one of focusing element 75 or work piece 20. This position may be located closer to either second machining surface 85 or predetermined surface 90. Alternatively, the position may be located equidistant from second machining surface 85 and from predetermined surface 90. In some embodiments, the location of focal point $\phi_2$ relative to predetermined surface 90 may be random. In other embodiments, the location of focal point $\phi_2$ relative to predetermined surface 90 may be cyclical. In other words, the relative location of focal point $\phi_2$ may change in a regular fashion during each iteration of step 120. In yet other embodiments, the location of focal point $\phi_2$ relative to predetermined surface 90 may be based on the location of the partially ejected material. The movement, relative to each other, of the at least one of focusing element 75 or work piece 20 may be via movement of focusing element 75 relative to predetermined surface 90. For example, controller 35 may use the focusing assembly actuator to move focusing element 75. Specifically, if the focusing assembly actuator includes a piezoelectric actuator, controller 35 may alter the electric current applied to the focusing assembly actuator to move focusing element 75. Alternatively, the movement, relative to each other, of the at least one of focusing element 75 or work piece 20 may be via movement of work piece 20 relative to predetermined surface 90. For example, controller 35 may use the actuator associated with base 25 to move work piece 20.

Next, controller 35 may emit laser beam 65 (sub-step 200), which may remove the partially ejected material, as previously discussed. Controller 35 may emit laser beam 65 by communicating with laser emitter 60 to emit laser beam 65. In some embodiments, controller 35 may rotate axis α about axis β and/or tilt axis α to intersect axis β during this emitting, causing focal point $\phi_2$ to move and produce a tapered orifice 15. Controller 35 may rotate axis α about axis β and/or tilt axis α to intersect axis β by communicating with the optical devices housed by frame 55.

The removing described with respect to step 130 may also include sub-steps. In particular, controller 35 may re-focus laser beam 65 at focal point $\phi_3$, which may be approximately positioned on second machining surface 85 (sub-step 210). Controller 35 may re-focus laser beam 65 by communicating with the focusing assembly actuator or another actuator associated with focusing element 75 or base 25 to move, relative to each other, at least one of focusing element 75 or work piece 20. This movement may be via movement of focusing element 75 relative to predetermined surface 90. For example, controller 35 may use the focusing assembly actuator to move focusing element 75. Specifically, if the focusing assembly actuator includes a piezoelectric actuator, controller 35 may alter the electric current applied to the focusing assembly actuator to move focusing element 75. Alternatively, the movement, relative to each other, of the at least one of focusing element 75 or work piece 20 may be via movement of work piece 20 relative to predetermined surface 90. For example, controller 35 may use the actuator associated with base 25 to move work piece 20.

Next, controller 35 may emit laser beam 65 (sub-step 220), which may remove material from second machining surface 85, as previously discussed. Controller 35 may emit laser beam 65 by communicating with laser emitter 60 to emit laser beam 65. In some embodiments, controller 35 may rotate axis α about axis β and/or tilt axis α to intersect axis β during this emitting, causing focal point $\phi_3$ to move and produce a tapered orifice 15. Controller 35 may rotate axis α about axis β and/or tilt axis α to intersect axis β by communicating with the optical devices housed by frame 55. Controller 35 may then proceed back to step 120 and treat second machining surface 85 as first machining surface 80.

It is contemplated that controller 35 may, by repeating steps 120-130, finish producing orifice 15. In doing so, controller 35 may prevent undesirable melting of work piece 20 by re-focusing laser beam 65 as material is removed from work piece 20. This re-focusing may help maximize a machining power of laser beam 65. That is, it may help maximize a speed at which the material is vaporized and/or ejected from second machining surface 85 by increasing a speed of the heating of the material. In particular, it is contemplated that the re-focusing may increase the speed of the heating of the material by preventing partially ejected material from blocking laser beam 65. Specifically, re-focusing laser beam 65 at focal point $\phi_2$ may cause laser beam 65 to contact and heat the partially ejected material. Once the ablation temperature of the partially ejected material is reached, it may be vaporized and ejected from orifice 15 such that it no longer blocks laser beam 65 from contacting second machining surface 85. Next, re-focusing laser beam 65 at focal point $\phi_3$ may maximize an amount of energy transferred from laser beam 65 to second machining surface 85, increasing the speed of the heating of the material. Once the ablation temperature of this material is reached, it may be vaporized and partially ejected from second machining surface 85. Thus, increasing the speed of the heating of the material may reduce a likelihood of the material melting within orifice 15 by increasing the rate at which material is removed from orifice 15.

It will be apparent to those skilled in the art that various modifications and variations can be made to the disclosed machining system and method. Other embodiments will be apparent to those skilled in the art from consideration of the specification and practice of the disclosed machining system. For example, although described for use in producing an orifice within a fuel injector tip, it is contemplated that machining system 10 may alternatively or additionally be used to produce orifice(s) within other components such as, for example, turbine blades or circuit boards, if desired. It is intended that the specification and examples be considered as exemplary only, with a true scope being indicated by the following claims and their equivalents.

What is claimed is:

1. A variable focus laser machining system configured to ablate a surface of a work piece, comprising:

a laser emitter configured to emit a laser beam;
a focusing element configured to focus the laser beam; and
a controller configured to:
- focus the laser beam at a first focal point on the surface to ablate material from a first machining surface to a second machining surface, the ablation of material resulting in partially ablated material being retained on the work piece, the first focal point being approximately positioned on the first machining surface;
- determine that the first machining surface has moved relative to the first focal point;
- determine a location of a second focal point based on the location of the first machining surface and the second machining surface;
- re-focus the laser beam at a second focal point to ablate the partially ablated material; and
- re-focus the laser beam at a third focal point approximately positioned on the second machining surface.

2. The machining system of claim 1, further including an actuator configured to move the focusing element relative to the work piece, wherein:
- the controller is in communication with the actuator; and
- the focusing and the re-focusing each include moving, relative to each other, at least one of the focusing element or the work piece.

3. The machining system of claim 2, wherein the actuator is further configured to move the focusing element relative to the first machining surface, wherein the moving, relative to each other, of the at least one of the focusing element or the work piece includes moving the focusing element relative to the first machining surface.

4. The machining system of claim 2, wherein the actuator includes a piezoelectric actuator.

5. The machining system of claim 1, wherein the controller is configured to determine the location of the second focal point based on the location of a predetermined surface, the location of the predetermined surface being determined from a look-up table that correlates machining depth to machining time, the predetermined surface being an indicator of the partially ablated material retained on the work piece.

6. The machining system of claim 5, wherein the first focal point is approximately positioned on the predetermined surface.

7. The machining system of claim 1, wherein the controller is further configured to:
- emit the laser beam after the focusing of the laser beam at the first focal point, wherein the determining that the first machining surface has moved includes predicting that the first machining surface has moved based on a time at which the laser beam is emitted; and
- subsequently emit the laser beam after the re-focusing of the laser beam at the second focal point.

8. The machining system of claim 1, wherein the controller is configured to determine the location of the second focal point based on a look-up table.

9. The machining system of claim 1, wherein the controller is configured to determine the location of the second focal point based on operator input.

10. The machining system of claim 5, wherein the first focal point is positioned downstream of the predetermined surface.

11. A fuel injector tip orifice machining system, comprising:
- a laser emitter configured to emit a laser beam;
- a focusing element configured to focus the laser beam;
- a base configured to position a fuel injector tip relative to the laser emitter;
- an actuator configured to move the focusing element relative to the fuel injector tip; and
- a controller in communication with the actuator, the controller being configured to:
  - focus the laser beam at a first focal point on a surface of the fuel injector tip to ablate material from a first machining surface to a second machining surface, the ablation of material resulting in partially ablated material being retained on the work niece, the first focal point being approximately positioned on the first machining surface, wherein the focusing includes moving the focusing element relative to the fuel injector tip;
  - determine that the first machining surface has moved relative to the first focal point;
  - determine a location of a second focal point based on the location of the first machining surface and the second machining surface;
  - re-focus the laser beam at a second focal point to ablate the partially ablated material; and
  - re-focus the laser beam at a third focal point approximately positioned on the second machining surface, wherein the re-focusing includes moving the focusing element relative to the fuel injector tip.

12. The machining system of claim 11, wherein the controller is configured to determine the location of the second focal point based on a look-up table that correlates machining depth to machining time.

13. A method of machining a surface of a work piece using a laser beam, comprising:
- focusing the laser beam at a first focal point on the surface to ablate material from a first machining surface to a second machining surface, the ablation of material resulting in partially ablated material being retained on the work piece, the first focal point being approximately positioned on the first machining surface of a work piece;
- determining that the first machining surface has moved relative to the first focal point;
- determining a location of a second focal point based on the location of the first machining surface and the second machining surface;
- re-focusing the laser beam at a second focal point to ablate the partially ablated material; and
- re-focusing the laser beam at a third focal point approximately positioned on the second machining surface.

14. The method of claim 13, wherein the focusing and the re-focusing each include moving, relative to each other, at least one of a focusing element or the work piece, the focusing element being configured to focus the laser beam.

15. The method of claim 14, wherein the moving, relative to each other, of the at least one of the focusing element or the work piece includes moving the focusing element relative to the first machining surface.

16. The method of claim 14, wherein the moving, relative to each other, of the at least one of the focusing element or the work piece includes altering an electric current applied to a piezoelectric actuator, the piezoelectric actuator being configured to move the at least one of the focusing element or the work piece in response to the electric current.

17. The method of claim 13, further including:
- emitting the laser beam after the focusing of the laser beam, wherein the determining that the first machining surface has moved includes predicting that the first machining surface has moved based on a time at which the laser beam is emitted; and subsequently emitting the laser beam after the re-focusing of the laser beam.

18. The method of claim 13, wherein determining the location of the second focal point includes determining the location of the second focal point based on the location of a predetermined surface, the location of the predetermined surface being determined from a look-up table that correlates machining depth to machining time, the predetermined surface being an indicator of the partially ablated material retained on the work piece.

19. The method of claim 18, wherein the first focal point is positioned downstream of the predetermined surface.

20. The method of claim 18, wherein the first focal point is approximately positioned on the predetermined surface.

* * * * *